United States Patent [19]

Sobanski et al.

[11] 3,761,634

[45] Sept. 25, 1973

[54] TOLL DIVERSION CONTROL ARRANGEMENT

[75] Inventors: Edward Walter Sobanski, Boulder; Olgerts Stauers, Lakewood, both of Colo.

[73] Assignee: Western Electric Company, Incorporated, New York, N.Y.

[22] Filed: May 30, 1972

[21] Appl. No.: 257,947

[52] U.S. Cl. .............................................. 179/18 DA

[51] Int. Cl. .............................................. H04m 1/66

[58] Field of Search .................... 179/18 DA, 27 CB

[56] References Cited

UNITED STATES PATENTS 3,651,275 3/1972 Regniere ........................ 179/27 CB

*Primary Examiner*—William C. Cooper

*Attorney*—R. J. Guenther et al.

[57] ABSTRACT

A toll diversion arrangement for private branch exchanges is disclosed in which a dial tone register circuit serves to monitor connections between restricted stations and central office trunk circuits for screening toll traffic. The arrangement includes a toll control circuit which is interposed between each central office trunk circuit and its associated network appearance for cooperating with the bridged dial tone register circuit in screening toll calls.

10 Claims, 1 Drawing Figure

PATENTED SEP 25 1973 3,761,634
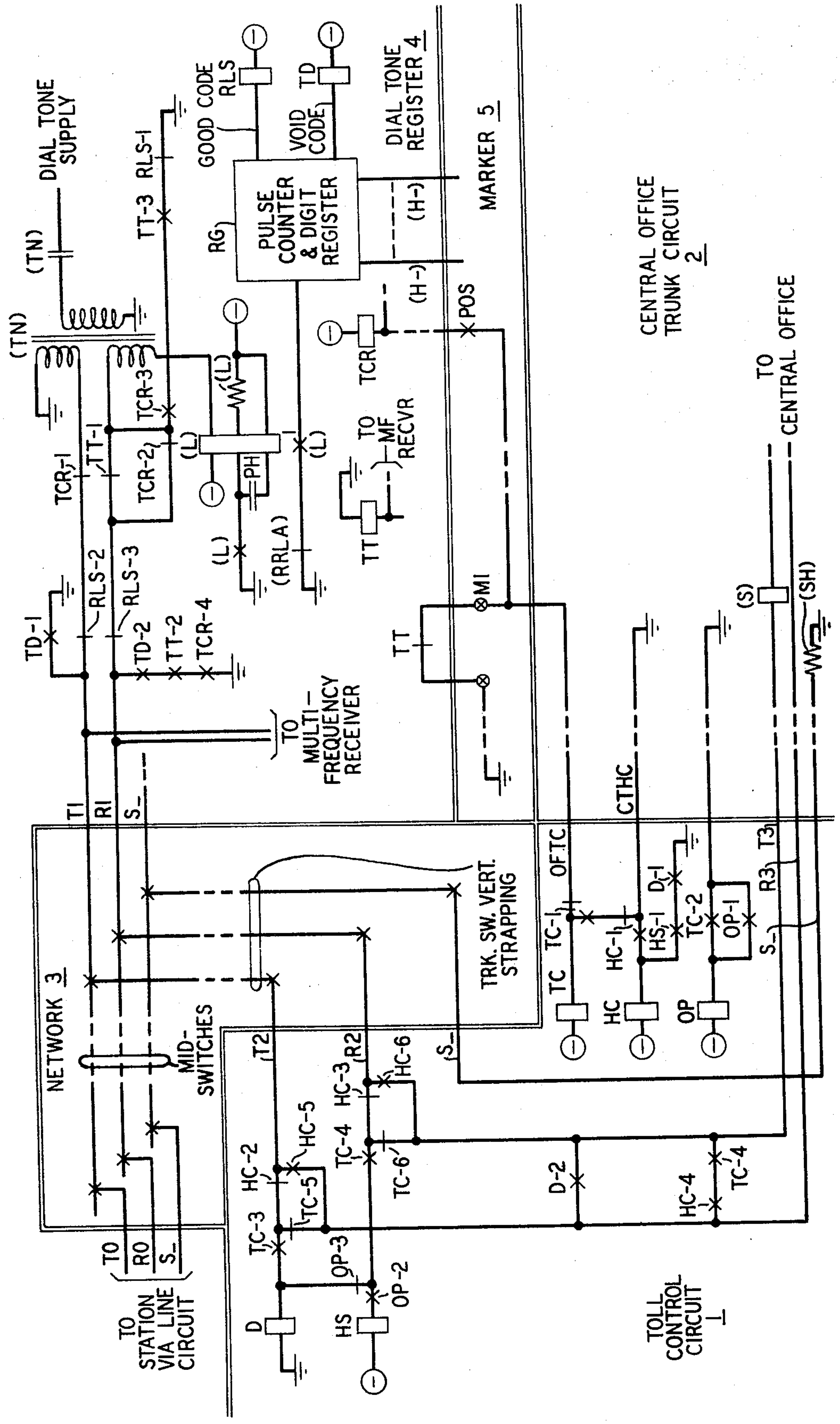

TOLL DIVERSION CONTROL ARRANGEMENT

BACKGROUND OF THE INVENTION

This invention concerns private branch exchanges (PBXs) and in particular toll call diversion arrangements.

In a PBX it is often times desirous to impose restrictions on station originated call traffic so that unwated costly toll calls are minimized. When this restriction is imposed, it is ordinarily limited in its application to certain stations and such calls must be routed to an attendant from those stations for completion through a toll office. In the past, toll call diversion equipment was almost entirely situated in the local central office. However, recent developments have enabled the PBX equipment along to screen these calls and have thereby eliminated costly signaling apparatus formerly employed between the PBX and the central office.

Among these recent developments, there is a PBX toll diversion arrangement in which a dial tone register serves, in addition to its usual functions, also to screen station originated digits after a network connection has been established between a central office trunk circuit and a station circuit. In that arrangement, the register circuit is bridged onto the established network connection to monitor the dialed digits. If the dialed code is representative of a toll office, the network connection is released.

Although this bridged arrangement has proven to be satisfactory particularly where station sets are equipped for multifrequency signaling, dial pulses from a rotary station dial set are distorted. The distortion is most severe where long unamplified trunk loops connect the PBX to the central office. Since costly conversion of the PBX station sets to multifrequency signaling is not feasible in most instances, and the cost of providing pulse correction with amplification in the outside plant is prohibitive, the bridged register circuit arrangement has not received wide acceptance.

It is an object of this invention to overcome the bridging effect which distorts dial pulses in bridged register circuit toll diversion arrangements.

SUMMARY OF THE INVENTION

This and other objects of the invention are achieved in accordance with an illustrative and a preferred embodiment of the invention in which a toll control circuit is imposed between each central office trunk circuit and its affiliated PBX network appearance. In addition, the supervisory and dial pulse repeating paths of the bridge dial tone register circuit are altered to cooperate with the toll control circuit. This latter circuit is selectively operated by common control, e.g., marker when the connected station is equipped with a rotary dial and a restricted class mark. The station pulsing path is split so that the register circuit pulsing relay is connected in series with a pulsing relay of the toll control circuit. This latter relay generates dial pulses in response to the received pulses at the trunk circuit advantageously isolating the trunk loop from the bridged register connection thereby overcoming the drawbacks of the prior art. If the call is not restricted, the split path is altered so that the toll control circuit is transparent and the dial pulses originated at the station are forwarded unaltered through the central office trunk circuit to the distant central offices.

On calls from multifrequency (m.f.) equipped stations, the combined circuitry of the dial tone register circuit and toll control circuit is selectively altered so that dialed digits from such stations are forwarded directly to the distant central office while the register circuit is bridged onto the connection.

The register circuit is released in the customary fashion on calls from nonrestricted stations.

If a restricted station dials a toll call, release of the established PBX network connection is effected under control of the dial tone register circuit. Upon detecting a void code, a signal is forwarded via the bridged network connection to the toll control circuit. In turn, the control circuit signals the trunk circuit to release the network connection concurrently with the release of the bridged network circuit.

It is a feature of the present invention to provide a toll control circuit which is interposed between a central office trunk circuit and its associated network appearance responsive to marker control signals to split the bridged network path connection on calls from restricted stations equipped with rotary dials, to repeat signals from said stations to the central office, and to cooperate with a bridged dial tone register circuit so as to release the network connection in the event a void code is dialed.

DESCRIPTION OF THE DRAWING

This and other objects and features of the invention will become more apparent upon a reading of the following description thereof taken in conjunction with the attached drawing showing a toll control circuit interposed between a conventional central office trunk circuit and its network appearance along with control connections to a marker and a dial pulse register circuit.

DESCRIPTION OF THE ARRANGEMENT

The drawing shows toll control circuit 1 at the lower left which connects to central office trunk circuit 2 as well as to network 3. Trunk circuit 2 has been skeletonized showing only enough of the circuitry necessary to an understanding of the invention. Additional details may be obtained by referring to FIG. 4 of U.S. Pat. No. 2,949,506 which issued to H. H. Abbott et al. on Aug. 16, 1960. The designations of the apparatus shown in FIG. 4 of the Abbott patent are retained, and bracketed in the drawing, e.g., relay (S).

Portions of a conventional dial tone register circuit are important to an understanding of this invention and they have been reproduced in the upper right hand corner of the drawing. For a more complete description of a register circuit, reference should be made to the aforementioned Abbott et al. patent and therein to FIGS. 14, 18 and 19. For continuity the designations of the Abbott et al. patent are employed here and shown bracketed. As part of this invention, circuitry is added in the conventinal register circuit to cooperate with toll control circuit 1. In particular relays TT, TC, TD and RLS are added and their functions will be explained hereinafter.

Register circuit 4, station line circuits (not shown in detail—see upper left corner) and toll circuit 1 are wired to appearances of crossbar switching network 3. Network 3 is selectively operated under control of marker 5 to interconnect any or all of these appearances. The operation of marker 5 in operating network 5 in response to calls is disclosed in the Abbott et al. patent. The bridged connection of a register circuit 4 via network 3 to screen toll calls, however, is not specifically discussed in the Abbott et al. patent and will be covered hereinafter.

Let us begin this consideration by reviewing in part the "so-called" tone dial connection during which time a calling station dials the call address of a network appearance. Typically, as a result of marker 5 operation an origination station is connected via its line circuit through an operated path of network 3 to dial tone register 4. The caller receives dial tone over the transmission path which can be traced from the line circuit via leads TO and RO, network 3, lead T1 and R1, contacts of relays RLS, TC and TT, via transformer (TN) and capacitor (TN) to the dial tone supply. It is to be noted that one winding of relay (L) in register 4 is in series relation with this path and is thereby responsive to loop opens and closures. As soon as a complete dial code is recieved, the dialed information is sent to the marker via lead (H-).

When the dial code identifies a central office routing, a connection is made via network 3 between the line circuit and toll control circuit 1 which interfaces central office trunk circuit 2. Specifically, leads TO, RO and S- of the line circuit are connected to leads T2, R2 and S- respectively. It is to be noted at this juncture that the drawing depicts only one trunk circuit connected via toll control circuit 1 to a network appearance. It must, however, be appreciated that a plurality of such trunks are ordinarily furnished in a PBX. Here, for convenience, only a single trunk circuit, ciruit 2, has been shown. Returning now to our discussion, if the originating station has a restricted class mark and is equipped with a rotary dial, terminal M1 in marker 5 is grounded, which ground is coupled via contacts of relays (not shown) in circuit 2 to lead OFTC and via contact TC-1 for operating relay TC. The latter locks operated via contact HC-1 to a ground circuit of circuit 2 to record this type of station originator.

Since the call is originated at a restricted station, register circuit 4 is left bridged on the network 3 connection between the calling station and toll control circuit 1. In addition, marker 5 signals register 4 to release all operated relays in the Pulse Counter and Digit Register which previously recorded the routing information. Also, relays RLS and TD are connected to the output of the Digit Register RG so as to respond to monitored digital information which is simultaneously forwarded via trunk circuit 2 to a distant central office as they are recorded by register 4.

Relay TCR of register 4 is operated if the originating station is restricted so as to split the bridged transmission path. The path for pulsing relay (L) of register 4 as well as relay D of circuit 1 concurrently may be traced as followed. Beginning at the upper winding of relay (L) the path includes transformer (TN), contacts TT-1 and RLS-3, lead R1, switched path of network 3, lead RO, the station circuit loop having pulsing contacts, lead TO, switched path of network 3 leading to circuit 1, lead T2, and contacts HC-2 and TC-3 which connect to the winding of relay D. Lead T1 of register 4 is isolated from the above-traced path by contact TCR-1.

Relay OP of circuit 1 operates via contact TC-2 and contacts (not shown) indicated by a dashed line of trunk circuit 2. The ground path is completed when trunk circuit 2 is ready to accept dial pulses. Operated contact OP-2 connects the winding of relay HS to lead R2 but this relay does not operate at this time because its winding is shunted by the winding of register circuit relay (L). As explained subsequently, relay HS operates whent he shunting winding is removed upon the release of register 4 from the network 3 connection.

During the pulsing interval relay (L) of register 4 as well as relay D of toll control circuit 1 follow the dial pulses. Contact 1 of relay (L) repeats each pulse which is then counted by the Pulse Counter and Digit Register RG. In toll control circuit 1, contact D-2 pulses the central office loop by opening and closing a shorting bridge on leads T3 and R3. It is to be noted that relay HC is released. Thus, the temporary bridge comprising contacts HC-4 and TC-4 is opened and does not interfere with the pulsing of the loop.

At the end of pulsing, if a restricted code is dialed, relay TD of register 4 operates. At the top center of the drawing operated contact TD-1 grounds lead T1 shunting down the winding of relay D. Relay D therefore releases and the loop to the central office is opened at contact D-2 discharging this call. In addition, relay (S) of central office trunk circuit 2 is released and the network holding path for this circuit is opened disconnecting toll control circuit 1 from the intro-office network connection. Accordingly, the station is connected only to dial tone register 4 which returns fast busy tone to the denied station.

If, at the end of pulsing, the dialed code is determined to be valid, relay RLS operates in dial tone register 4, and register 4 is released from the network connection. Relay HS which has been inoperative due to the bridging effect of the upper winding of relay (L), now operates in toll control circuit 1. Specifically, contacts RLS-2 and RLS-3 in leads T1 and R1 operate to disconnect the pulsing circuit of register 4 from its appearance in network 2 starting the normal release sequence. Relay HS of circuit 1 operates over a path which may be traced from its winding via contacts OP-2, TC-4 and HC-3, network 3, lead RO, the station loop, lead TO, network 3, lead T2, and contacts HC-2 and TC-3 to the winding of relay D which connects to ground.

As a result of the operation of relay HS, leads T2 and R2 cut through to leads T3 and R3 so that the station loop is directly connected to the central office trunk. Operated contact HS-1 connects ground via operated contact D-1 to the winding of relay HC. As a result, relay TC is released by the action of transfer contacts HC-1 which open the holding path for relay TC. Also, relay D releases when contact TC-3 opens to remove the pulse repeating bridge comprising contact D-2 from the central office trunk. Lead T2 is connected to lead T3 via contact HC-5 and lead R2 is connected to lead R3 via contact HC-6. The final condition of toll control circuit 1 is referred to as being "transparent" inasmuch as subsequent pulsing and supervisory signals are no longer repeated.

If the originating station is not restricted, terminal M1 in marker 5 is not grounded because the associated class mark relay opens the ground path to terminal M1. Toll control circuit 1 is "transparent" normally since lead T2 connects via contacts HC-2 and TC-5 to lead T3 and lead R2 connects via contacts HC-3 and TC-6 to lead R3. Thus, on non-restricted calls the station loop is directly connected to the central office trunk and the call is monitored by relay (S) in the conventional manner.

If the station originator is equipped for multifrequency dial pulsing and is also restricted, register 4 is bridged onto the outgoing connection as previously described but relay TC is not operated in control circuit 1 because lead M1 was opened by the relay TT previously operated when the central office trunk code was dialed. Dialed digits are monitored by a multifrequency receiver (not shown) bridged to leads T1 and R1. The output of that receiver is fed in a conventional manner directly into Pulse Counter and Digit Register RG for call number screening. If a restricted code is dialed, relay TD operates and leads T1 and R1 are grounded releasing trunk circuit 2 and associated control circuit 1. Ground is applied to lead T1 via contact TD-1 and to lead R1 via contacts TCR-4, TT-2 and TD-2. Since control circuit 1 is transparent, this action shorts out relay (S) of trunk circuit 2 causing it to release from network 3. Register 4 then returns fast busy tone to the denied station.

If the dialed code is not restricted, relay RLS operates and register 4 releases from the connection.

What is claimed is:

1. In a toll diversion arrangement for private branch exchanges having a dial pulse register bridged onto a network connection established between a restricted station and a central office trunk circuit, circuit means interposed between said trunk circuit and the network connection comprising, means activated by said register over said network connection for temporarily isolating said trunk circuit from dial pulses generated at said station, means monitoring said connection for repeating said pulses to said trunk circuit during the period said isolating means is activated, and means controlled in response to a signal on said network connection originated by said register upon detection of a dial restricted code for disconnecting said trunk circuit from said network connection.

2. The invention recited in claim 1 wherein said circuit further includes means under control of a different signal transmitted by said register upon detection of a valid dial coded for deactivating said isolating means thereby to permit the direct connection of said generated dial pulses to said trunk circuit.

3. A communication arrangement comprising a switching network through which calls are established on an automatic basis, a plurality of stations connected to said network, a register circuit being selectively connectable via said network to said stations for registering call destination information transmitted in the form of dial pulses by a connected one of said stations, a trunk circuit connected to a distant office over which calls are established between said stations and said distant office, means effective on calls from restricted ones of said stations to said office for establishing a bridiging connection which connects said register circuit over an established network path to said one restricted station and to said trunk circuit, circuit means interposed between said network path and said trunk circuit for cooperating with said register circuit in the screening and disconnection of calls being attempted to restricted destinations; and circuit means including (a) means for isolating a transmission path of said trunk circuit which couples said network path to said office, (b) means for forwarding received called destination information generated by said restricted station to said office while said digits are being screened by said connected register circuit, and (c) means under control of said connected register for releasing the established network path to said trunk circuit upon detection of a dial code designating a restricted destination.

4. The invention set forth in claim 3 further including means under control of signals from said register circuit transmitted over said network path for disabling said isolating means as well as said forwarding means in the event a non-restricted destination code is dialed.

5. The arrangement set forth in claim 3 wherein said bridged connection comprises a pair of transmission leads commonly connected to said restricted station, register circuit and said circuit means, and said isolating means comprises a relay controlled by said register circuit and having contacts connected in said transmission leads.

6. The invention set forth in claim 5 wherein said forwarding means comprises a relay having a winding connected to said leads and being operatively responsive to station generated dialed pulses, and having contacts thereof connected to transmission leads of said trunk circuit for forwarding station generated dial pulses directly to said distant office.

7. In a communication system having a trunk circuit connected to a distant office, a plurality of stations, means for establishing call connections between calling ones of said stations and said trunk circuit for completion of calls via said distant office, a toll diversion control arrangement for preventing completion of calls to toll dial areas via said trunk circuit from restricted ones of said stations comprising a register circuit selectively bridged onto the established call connection between each restricted station and said trunk circuit for monitoring the dialed digits, means responsive to said establishing means for interposing pulse repeating means in said established connection when said restricted station is equipped with a rotary dial so that station originated digits are repeated to said distant office, means for releasing said established call connection upon the detection of a toll area dial code in said register circuit, and means for removing said repeating means and releasing said register circuit if a non-toll area dial code is detected.

8. A communication arrangement comprising at least one station and a register circuit responsive to dial pulses generated at said station for translating a call destination code therefrom, a network responsive to a call origination for interconnecting said station to said register circuit via a plural wire path of said network, two leads of said path constituting a pulse transmission circuit over which said dial pulses are forwarded to said register circuit, first relay means in said register circuit connected to said transmission circuit and being responsive to said dial pulses, means cooperating with said register circuit for establishing a bridged connection via said network upon translation of a distant office code by said register circuit, said bridge connection comprising a parallel connection of a toll control circuit into the existing connection on said plural wire path, a central office trunk circuit connected to said distant office and to said toll control circuit, said toll control circuit comprising a second and third relay each having windings respectively connected to separate leads of said pulse transmission circuit, said second relay being operatively responsive with said first relay means to subsequently received dial pulses, contacts of said second relay connected to said trunk circuit for repeating dial pulses to said office, and a digit translator of said register circuit controlled by contacts of said first relay means for screening station dialed codes.

9. The arrangement set forth in claim 8 further including a fourth relay connected to an output of said digit translater and being operative upon detection of a predetermined restrictive code, and contacts of said fourth relay being operative for releasing said second relay thereby causing said bridged connection to be released.

10. The arrangement set forth in claim 8 further including a fifth relay connected to another output of said digit translator and being operative upon detection of an allowed code, contacts of said fifth relay being operative to release said first relay means as well as to operate said third relay means, and contact means of said third relay means being operative to directly connect said originating station to said trunk circuit.

* * * * *